United States Patent
Kalluri et al.

(10) Patent No.: US 12,393,860 B2
(45) Date of Patent: Aug. 19, 2025

(54) SYSTEMS AND METHODS FOR OPTIMIZING MACHINE LEARNING MODELS BY SUMMARIZING LIST CHARACTERISTICS BASED ON MULTI-DIMENSIONAL FEATURE VECTORS

(71) Applicant: Oracle International Corporation, Redwood Shores, CA (US)

(72) Inventors: Sudhakar Kalluri, Cupertino, CA (US); Swetha Krishnakumar, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1069 days.

(21) Appl. No.: 16/524,440

(22) Filed: Jul. 29, 2019

(65) Prior Publication Data
US 2021/0035025 A1    Feb. 4, 2021

(51) Int. Cl.
*G06N 20/00* (2019.01)
*G06F 18/23213* (2023.01)

(52) U.S. Cl.
CPC ....... *G06N 20/00* (2019.01); *G06F 18/23213* (2023.01)

(58) Field of Classification Search
None
See application file for complete search history.

(56) References Cited

U.S. PATENT DOCUMENTS

| | | | | |
|---|---|---|---|---|
| 5,317,507 A | * | 5/1994 | Gallant | G06F 16/355 707/E17.08 |
| 5,325,298 A | * | 6/1994 | Gallant | G06F 16/3332 707/999.005 |
| 5,794,178 A | * | 8/1998 | Caid | G06F 16/3347 707/999.005 |

(Continued)

FOREIGN PATENT DOCUMENTS

| | | | | |
|---|---|---|---|---|
| WO | WO-2008066341 A1 | * | 6/2008 | ........... G06F 21/552 |
| WO | WO-2020062689 A1 | * | 4/2020 | ........... G06K 9/6218 |

OTHER PUBLICATIONS

Ganti et al, "CACTUS-Clustering Categorical Data Using Summaries", KDD '99: Proceedings of the fifth ACM SIGKDD international conference on Knowledge discovery and data mining Aug. 1999 pp. 73-83 https://doi.org/10.1145/312129.312201 (Year: 1999).*

(Continued)

*Primary Examiner* — Viker A Lamardo
*Assistant Examiner* — Leah M Feitl
(74) *Attorney, Agent, or Firm* — Invoke

(57) ABSTRACT

Techniques for summarizing lists for machine learning operations are disclosed. In some embodiments, a machine learning system generates feature vectors for a set of items based on varying values among a set of feature attributes. The system further generates, based on the feature vectors a set of clusters and generates a summary vector for a list of items as a function of the distribution of the items within the set of clusters, where the summary vector has a length equal to how many clusters are in the set of clusters. Summary (Continued)

vectors may be generated for a plurality of examples within a training dataset. The system may use the summary vectors to train a machine learning model to estimate unknown labels for new examples.

20 Claims, 8 Drawing Sheets

(56) References Cited

U.S. PATENT DOCUMENTS

| | | | | |
|---|---|---|---|---|
| 5,857,169 | A * | 1/1999 | Seide | G10L 15/14 704/221 |
| 7,349,914 | B1 * | 3/2008 | Ordonez | G06F 18/23213 707/999.102 |
| 2003/0101024 | A1 * | 5/2003 | Adar | G06Q 30/02 707/E17.107 |
| 2007/0022065 | A1 * | 1/2007 | Hatano | G06F 16/285 706/16 |
| 2007/0179924 | A1 * | 8/2007 | Zhong | G06F 16/353 707/E17.09 |
| 2010/0250477 | A1 * | 9/2010 | Yadav | G06N 20/00 706/14 |
| 2011/0029464 | A1 * | 2/2011 | Zhang | G06N 20/00 706/12 |
| 2011/0093464 | A1 * | 4/2011 | Cvet | G06F 16/355 707/E17.089 |
| 2013/0117302 | A1 * | 5/2013 | Lee | G06F 16/2237 707/769 |
| 2015/0052139 | A1 * | 2/2015 | Cevahir | G06F 16/285 707/737 |
| 2015/0169727 | A1 * | 6/2015 | Araki | G06F 16/353 707/737 |
| 2016/0078361 | A1 * | 3/2016 | Brueckner | H04L 67/10 706/12 |
| 2017/0018038 | A1 * | 1/2017 | Watanabe | H02J 3/00 |
| 2017/0255617 | A1 * | 9/2017 | Vartakavi | G06F 16/41 |
| 2019/0340520 | A1 * | 11/2019 | Oyamada | G06F 16/285 |
| 2020/0265218 | A1 * | 8/2020 | Dai | G06V 10/764 |

OTHER PUBLICATIONS

San et al, "An alternative extension of the k-means algorithm for clustering categorical data", Int. J. Appl. Math. Comput. Sci., 2004, vol. 14, No. 2, 241-247 (Year: 2004).*

Goswami et al, "Categorical Data Clustering based on an Alternative Data Representation Technique", International Journal of Computer Applications (0975-8887) vol. 72—No. 5, May 2013 (Year: 2013).*

* cited by examiner

SYSTEMS AND METHODS FOR OPTIMIZING MACHINE LEARNING MODELS BY SUMMARIZING LIST CHARACTERISTICS BASED ON MULTI-DIMENSIONAL FEATURE VECTORS

TECHNICAL FIELD

The present disclosure relates to machine learning systems and applications. In particular, the present disclosure relates to training, tuning, and evaluating machine learning models based on summary vectors that characterize lists of items.

BACKGROUND

Machine learning involves techniques through which computing systems make inferences and adjustments during runtime rather than relying on static instruction sets to perform tasks. Machine learning has a wide range of applications, such as tuning search engine results, diagnosing medical conditions, recognizing images, recommending relevant items, forecasting resource utilization, responding to natural language inputs through virtual assistants, and improving autonomous driving vehicles, among several others.

Many machine-learning applications operate on lists of items. For example, recommendation systems may use machine learning to recommend users that are most likely to view, select, or otherwise interact with a given list of items. As another example, a campaign analysis tool may use machine learning to predict click-through rates and other metrics across different lists of recipients. In such applications, the accuracy and efficiency of machine-learning models may vary significantly depending on how lists are characterized and provided as input.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
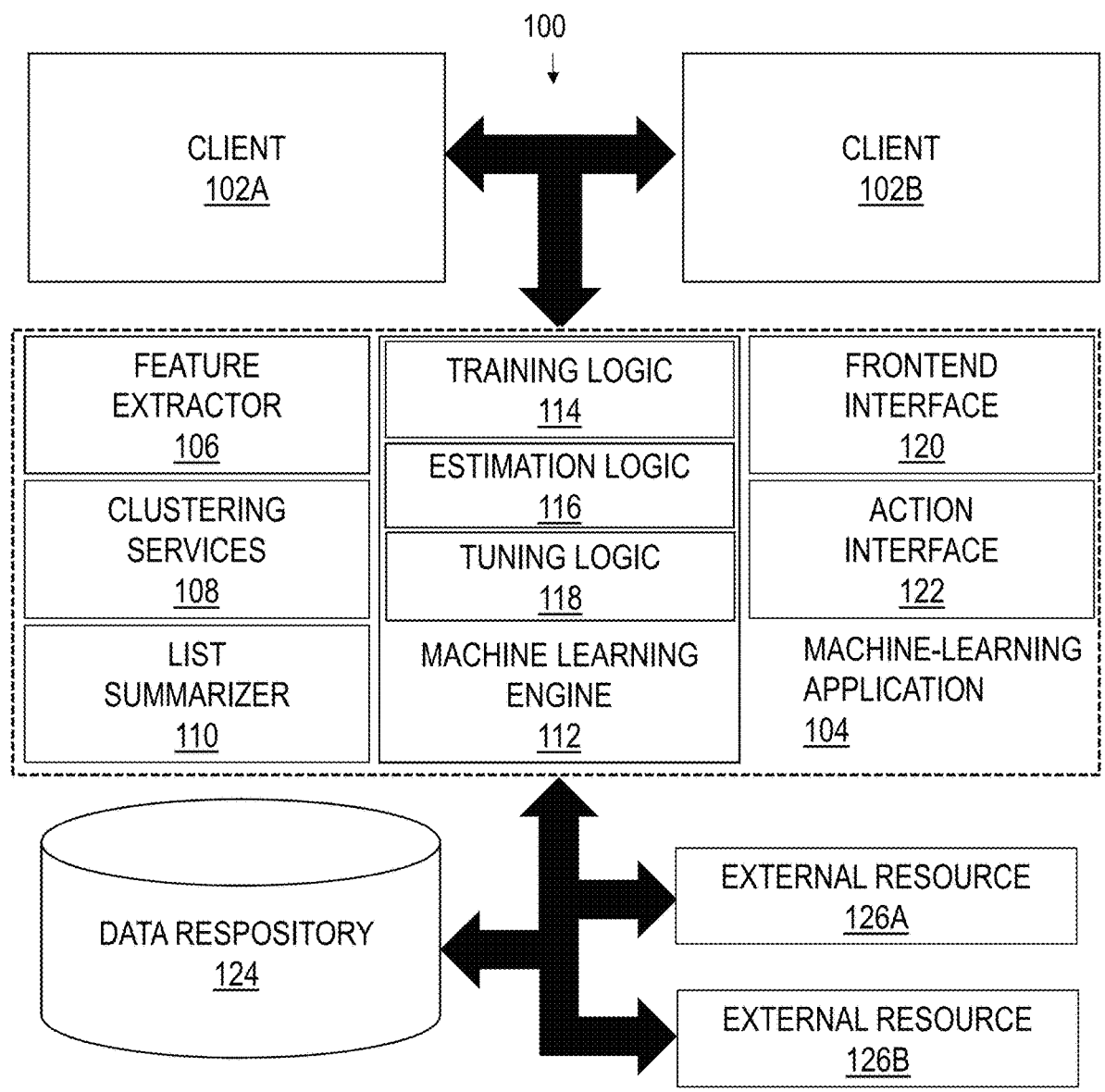
FIG. 1 illustrates a machine-learning system that operates on lists of items in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 SUMMARY VECTORS FOR CHARACTERIZING LISTS
   3.1 PRE-COMPUTED CLUSTERING
   3.2 DISTRIBUTION-BASED LIST SUMMARIZATION
   3.3 HARD AND SOFT CLUSTERING SELECTION
   3.4 SUMMARY-BASED VISUALIZATIONS AND ACTIONS
4.0 MACHINE-LEARNING OPTIMIZATIONS AND APPLICATIONSMos
   4.1 MODEL TRAINING BASED ON LIST SUMMARIZATIONS
   4.2 MODEL PREDICTIONS USING SUMMARY VECTORS
   4.3 MODEL TUNING
5.0 COMPUTER NETWORKS AND CLOUD NETWORKS
6.0 MICROSERVICE APPLICATIONS
7.0 HARDWARE OVERVIEW
8.0 MISCELLANEOUS; EXTENSIONS

1.0 General Overview

Techniques are described herein for summarizing list characteristics based on multi-dimensional feature vectors. The summarization techniques may be used to train, tune, evaluate, and further optimize machine-learning (ML) models. The techniques allow for ML systems to make more powerful inferences, especially in applications that operate over non-homogenous lists.

In some embodiments, items on a list are represented by a feature vector including the values of two or more feature attributes. A feature in this context refers to an attribute that may have varying values between different items on the list. For example, a feature vector for a software resource in a list of software resources may identify what version of code the respective software resource is running, what patches have been applied, and/or the current configuration settings of the respective software resource. Additionally or alternatively, other features may be included in the feature vector. As another example, a feature vector for a recipient in a list of recipients may identify age, income, and/or other demographic information about the respective recipient. The number and types of feature vectors may vary from implementation to implementation.

A list of items may be characterized by a multi-dimensional m×n feature vector that is an aggregate of the feature vectors of the individual items, where m represents the number of items in the list and n represents the number of features that characterize each individual item. Thus, the size of the multi-dimensional feature vector increases as the number of items on the list and the number of features used to characterize the individual items increase. In large-scale applications, the size of the multi-dimensional vector may be substantial, leading to a significant amount of processing overhead.

A summary vector allows for a more memory efficient and compact characterization of a list. One approach for generating a summary vector is to compute the average vector, also referred to a centroid, of the feature vectors for each item on the list. The result is a summary vector of length n where each component in the summary vector is the average value for a respective feature across all items in the list. While this approach provides a more compact representation of a list of items than the multi-dimensional feature vector, the summary vector is generally not useful for non-homogenous groups. In particular, the average feature value across all items in a list has limited meaning when the items are significantly spread out and dissimilar in the feature space.

In some embodiments, a summary vector for a given list of items is generated as a function of the distribution of the list elements over a pre-determined set of item-clusters. Each component in the summary vector may correspond to a different cluster in the set of item-clusters and be computed based on the proportion or occurrence frequency of which items in the list are assigned to the cluster. The result is a summary vector that has a length equal to the number of clusters in the pre-determined set of item-clusters. Thus, the summary vector is a compact representation that conveys meaningful information about the distribution of items in a list. This information may not be readily apparent from the raw feature vector values and may also be useful in a variety of ML applications, as described further herein.

In some embodiments, the pre-determined set of item-clusters may be computed using hard clustering or soft clustering. With hard clustering, the items are divided along the multi-dimensional feature vector space into k disjoint cluster regions, with each item belonging to one and only one of the k clusters. With soft clustering, the items are assigned a probability of membership in each of the k clusters. Each respective item may be assigned a k-long vector reflecting the cluster-membership probabilities for the respective item.

In some embodiments, the summarization techniques are used to train ML models. An ML system may receive a set of training examples, where each example is associated with a list and a label. A label in this context refers to an outcome or metric for the training example. For example, a label may identify the click-through rate for a given list of recipients of an online campaign or the success rate of deploying a patch to a list of software deployments. An ML system may generate a summary vector for each example in a set of training examples. The ML system may use the summary vectors, in isolation or in conjunction with other features, to train a ML model to estimate unknown labels for new examples based on learned patterns.

As new examples are received, the ML system may generate corresponding summary vectors as a function of the distribution of the new example's items among the pre-determined set of clusters. In some embodiments, the length of the summary vector for the new examples and training examples is equal to the number of clusters in the pre-determined set. The ML system may then estimate/predict an unknown label for a new example based at least in part on a summary vector for the new example.

In some embodiments, the ML system may tune a ML model by adjusting one or more parameters of the summary vector, such as the number of clusters in the pre-determined set of clusters and/or the features used to form the clusters. The tuning process may include training a plurality of candidate ML models using different parameters, computing the estimation error for each model over the set of training examples, and selecting the model with the lowest estimation error. The selected model may then be used to evaluate new examples.

One or more embodiments described in this Specification and/or recited in the claims may not be included in this General Overview section.

2.0 System Architecture

FIG. 1 illustrates an ML system that operates on lists of items in accordance with some embodiments. As illustrated in FIG. 1, system 100 includes clients 102a-b, ML application 104, data repository 124, and external resources 126a-b. System 100 and ML application 104 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, ML application 104 provides components through which inferences and adjustments may be automatically made during application runtime rather than relying on static instruction sets to perform tasks. These components may include feature extractor 106, clustering services 108, list summarizer 110, ML engine 112, frontend interface 120, and action interface 122. However, as previously indicated the components of system 100, including ML application 104 may vary depending on the particular implementation.

Feature extractor 106 is configured to identify feature value, which may vary between different examples, and form feature vectors. For example, an enterprise management system may periodically collect and send information about the computing resources deployed within a datacenter environment. Feature extractor 106 may parse the returned information to extract various feature values for a list of software resources, such as what version of code each software resource is running, what patches have been applied, and/or the current configuration settings of each software resource. As another example, feature extractor may parse a list of contacts in a database to extract various features such as age, income level, and/or other demographic information. Thus, the features that are extracted may vary from implementation to implementation. Further, feature extractor 106 may also modify the features during runtime to tune a ML model, as described further herein.

Clustering services 108 are configured to pre-compute a set of item-clusters and assign new items to the pre-compute set of item clusters. During the pre-computation phase, clustering services 108 may receive a set of item feature vectors from feature extractor 106 as inputs and output a set of clusters. Clustering services 108 may use hard clustering or soft clustering, as previously mentioned. Once the set of clusters has been computed, clustering services 108 may receive, as input, a list of items and output one or more cluster membership vectors identifying how the items have been assigned to the set of clusters. Clustering services 108 may modify the number of clusters in the set of item-clusters during runtime to tune a ML model, as described further herein.

List summarizer 110 is configured to generate summary vectors of lists of items. List summarizer 110 may receive, as input, one or more cluster membership vectors from clustering services 108 for a given list of items. In some embodiments, the input comprises m k-long cluster membership vectors, where m represents the number of items in the list and k represents the number of clusters in the pre-computed set. List summarizer 110 may then convert the cluster membership vectors into a k-long summary vector.

ML engine 112 is configured to automatically learn, from a training dataset, patterns leading to particular outcomes and to output predicted outcomes for new examples. ML engine 112 includes training logic 114 for training ML models, estimation logic 116 for estimating unknown labels for new examples, and tuning logic 118 for optimizing the parameters ML models. Techniques for training ML models, outputting estimates, and tuning model parameters are described in further detail in the sections below.

Frontend interface 120 manages interactions between ML application 104 and clients 102*a-b*. For example, a client may submit requests to perform various functions and view results through frontend interface 120. A client in this context may be a human user, such as a system administrator, or another application, such as a shell or client application.

In some embodiments, frontend interface 120 is a presentation tier in a multitier application. Frontend interface 120 may process requests received from clients, such as clients 102*a-b*, and translate results from other application tiers into a format that may be understood or processed by the clients. Frontend interface 120 may be configured to render user interface elements and receive input via user interface elements. For example, frontend interface 120 may generate webpages and/or other graphical user interface (GUI) objects. Client applications, such as web browsers, may access and render interactive displays in accordance with protocols of the internet protocol (IP) suite. Additionally or alternatively, frontend interface 120 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In some embodiments, action interface 122 provides an interface for executing actions using computing resources, such as external resources 126*a-b*. Action interface 122 may include an API, CLI, or other interface for invoking functions to execute actions. One or more of these functions may be provided through cloud services or other applications, which may be external to ML application 104. For example, one or more components of system 100 may invoke an API of an email client application to transmit a targeted email message to a list of recipients. As another example, an API of a publishing tool may be invoked to trigger a targeted social media post to one or more social media platforms for a list of social media users. In yet another example, action interface 118 may submit commands to reconfigure software and/or hardware resources on a given list. Thus, the actions that are performed may vary from implementation to implementation.

In some embodiments, actions may be automatically triggered based on outputs received from ML engine 112. For example, action interface 122 may trigger an action for a given list of recipients if and only if the estimated label satisfies a particular threshold. In the context of campaign analytics, for instance, action interface 122 may publish a targeted campaign message to a given list of recipients if and only if the estimated click-through rate exceeds a threshold. As another example, action interface 122 may push a patch set update (PSU) on a given set of software deployments if and only if the estimated failure rate is lower than a threshold. Additionally or alternatively, other actions may also be triggered depending on the particular implementation. Additionally or alternatively, actions may be triggered responsive to client requests received through frontend interface 120.

In some embodiments, external resources 126*a-b* are network services that are external to ML application 104. Example cloud services may include, but are not limited to, social media platforms, email services, short messaging services, enterprise management systems, and other cloud applications. Action interface 122 may serve as an API endpoint for invoking a cloud service. For example, action interface 122 may generate outbound requests that conform to protocols ingestible by external resources 126*a-b*. Action interface 122 may process and translate inbound requests to allow for further processing by other components of ML engine 112. Action interface 122 may store, negotiate, and/or otherwise manage authentication information for accessing external resources 126*a-b*. Example authentication information may include, but is not limited to, digital certificates, cryptographic keys, usernames, and passwords. Action interface 122 may include authentication information in the requests to invoke functions provided through external resources 126*a-b*.

In some embodiments, ML application 104 is a cloud service, such as a software-as-a-service (SaaS) or a web service. Clients, such as clients 102*a-b*, may be a web browser, mobile application, or other software application communicatively coupled to a network. A client may interact with cloud services using one or more communication protocols, such as HTTP and/or other communication protocols of the Internet Protocol (IP) suite. In other embodiments, ML application 104 may be locally accessible to a user, such as a desktop or other standalone application.

In some embodiments, data repository 124 stores data generated and/or otherwise accessed by components of ML application 104. Example data may include, but is not limited to, trained ML models, summary vectors, item-lists, item-clusters, GUI data, cluster membership vectors, and feature vectors. Data repository 124 may be any type of storage unit and/or device (e.g., a file system, database, collection of tables, or any other storage mechanism) for storing data. Further, data repository 124 may include multiple different storage units and/or devices. The multiple different storage units and/or devices may or may not be of the same type or located at the same physical site. Further, data repository 124 may be implemented or may execute on the same computing system as one or more other components of system 100. Alternatively or additionally, data repository 124 may be implemented or executed on a computing system separate from one or more other components of system 100. Data repository 124 may be communicatively coupled to one or more components illustrated in system 100 via a direct connection or via a network.

Additional embodiments and/or examples relating to computer networks and microservice applications are described below in Section 5.0, titled "Computer Networks and Cloud Networks" and Section 6.0, titled "Microservice Applications".

3.0 Summary Vectors for Characterizing Lists

3.1 Pre-Computed Clusters

Figure 2:
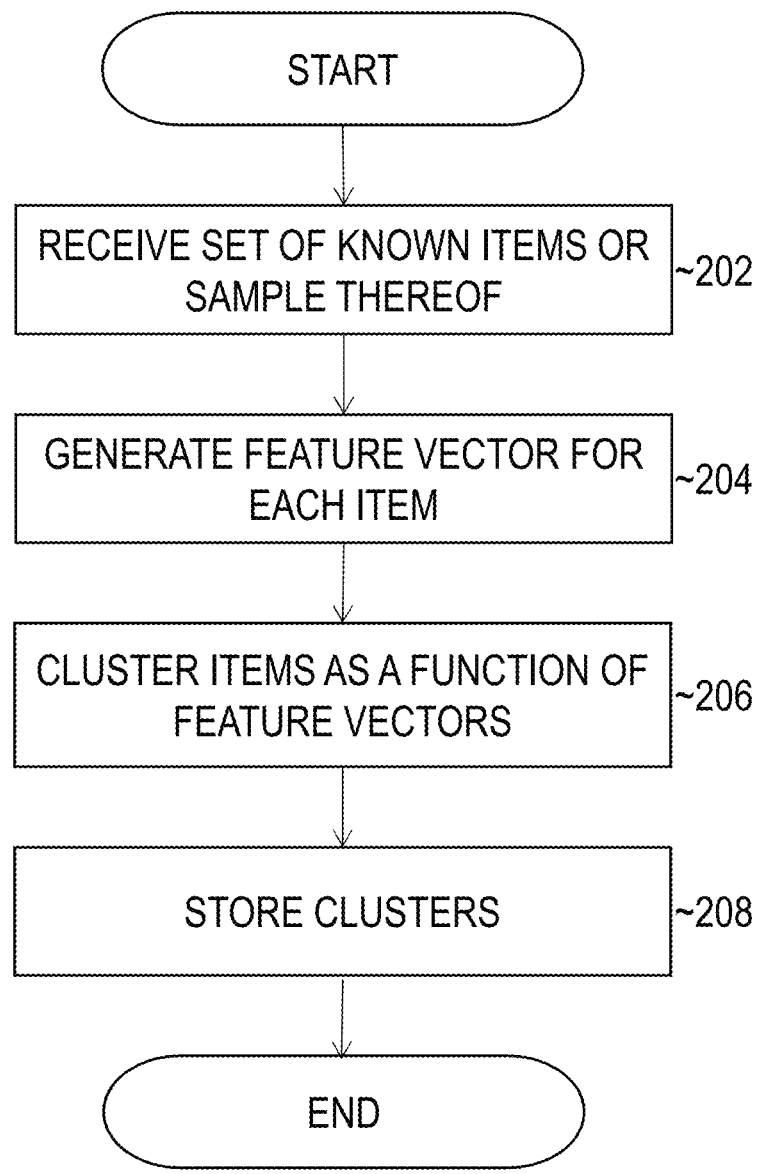
FIG. 2 illustrates an example set of operations for clustering items in accordance with some embodiments.

In some embodiments, a pre-computation phase for summarizing lists includes generating a set of item-clusters for the universe of known items or a representative sample subset thereof. FIG. 2 illustrates an example set of operations for clustering items in accordance with some embodiments. One or more operations illustrated in FIG. 2 may be modified, rearranged, or omitted. Accordingly, the particular sequence of operations illustrated in FIG. 2 should not be construed as limiting the scope of one or more embodiments.

The clustering process includes receiving a set of known items or a sample thereof (operation 202). The universe of known items may include all items that have been observed or are otherwise accessible to ML application 104. For example, the set of items may include all known potential recipients for an online campaign message or a list of all known users of a content subscription services for which recommendations may be generated. As another example, the set of items may include a list of all software deployments in a datacenter environment. Thus, the set of items may vary depending on the particular implementation.

To reduce the number of items that are clustered in the precomputation phase, the clustering process may use a representative sample of the universe of known items. A representative sample includes a subset of items that approximates the characteristics of the universe of known items. A representative sample may be obtained through sampling algorithms, examples of which include, but are not limited to, simple random sampling, interval sampling, stratified sampling and Poisson sampling.

The clustering process next generates a respective feature vector for each respective item (operation 204). As previously mentioned, the number and type of features that are selected may vary from implementation to implementation. In some embodiments, the features may be curated by an expert to inject domain knowledge into the clustering process. In other embodiments, the features may be automatically determined and selected based on which features yield the most optimal model. Techniques for selecting features are described in further detail in Section 4.3, titled "Model Tuning".

The clustering process next clusters the items as a function of the feature vectors generated for each respective item (operation 206). In some embodiments, a hard clustering algorithm is used to assign each respective item to one and only one cluster. One example hard clustering approach is hard k-means clustering. According to this approach, the clustering process is initialized by choosing k centroids, which may be the feature vectors of k randomly chosen items or the centroid of a randomly generated partition of items. The approach next assigns (or reassigns) each item to a cluster whose mean has the least squared Euclidean distance from the respective feature vector. After the assignment/reassignment step, the approach calculates the new means for the clusters. The assignment and centroid update steps are repeated until the assignments no longer change. Another hard clustering approach is tri-point arbitration, which generates a similarity matrix using the set of feature vectors and partitions items based on the eigenvalues and eigenvectors of the similarity vectors. This approach is described further in U.S. application Ser. No. 15/140,358, now U.S. Pat. No. 10,073,906, titled "SCALABLE TRI-POINT ARBITRATION AND CLUSTERING", which is hereby incorporated by reference as if set forth in its entirety. Other hard clustering approaches include, but are not limited to, spectral clustering and k-modes clustering.

Additionally or alternatively, a soft clustering algorithm may be used to cluster the set of items. With soft clustering, also referred to as fuzzy clustering, each item may belong to more than one cluster. An example soft clustering approach is soft k-means clustering. Soft k-means clustering is similar to hard k-means clustering except that each item has a set of coefficients giving the probability of being in each cluster. The sum of the coefficients for a given item is equal to 1 (or 100%) and may be stored in a respective cluster membership vector for the item. For example, a cluster membership vector of [0.3, 0.6, 0.1] may indicate that the item has a 30% probability of belonging to the first cluster, a 60% probability of belonging to the second cluster, and a 10% probability of belonging to the third cluster when k=3. The soft k-means clustering may include assigning coefficients randomly to each item to initialize the data. The process then computes the centroid for each cluster and updates the coefficients of being in the clusters and repeats until the coefficients' change is less than a sensitivity threshold.

The clustering process next stores the clusters in volatile and/or non-volatile storage (operation 208). In some embodiments, only the cluster centroids are retained to provide a compact representation in memory. The individual data points, which may number in the thousands or more, may be discarded.

The example clustering algorithms given above are given to facilitate understanding. However, other clustering algorithms may also be used to group items. The result is a set of distinct groups which may allow ML application 104 to make more powerful inferences. For example, one cluster may represent recipients with high incomes living in a particular geographic location, which may have different click-through patterns than a second cluster representing recipients with high incomes living in a different geographic location and a third cluster representing recipients with much lower incomes. In other cases, distinct groups may follow similar patterns depending on the particular campaign being presented. As another example, a cluster of software deployments running from a particular set of source components may respond much differently to patch-set updates than software deployments running from a different set of source components. Other patterns, which may not be readily apparent, may also be learned and inferred by ML application 104.

3.2 Distribution-Based List Summarization

Once computed, the set of item clusters may be used to generate summary vectors for various lists of items. As previously mentioned, a summary vector for a list may be computed as a function of the distribution of the respective set of items in the list within the set of clusters. A summary vector provides a compact in-memory representation of a list allowing for efficient training of ML models. Further the summary vector allows inferences to be drawn based on distribution patterns of various lists in a training dataset.

Figure 3:
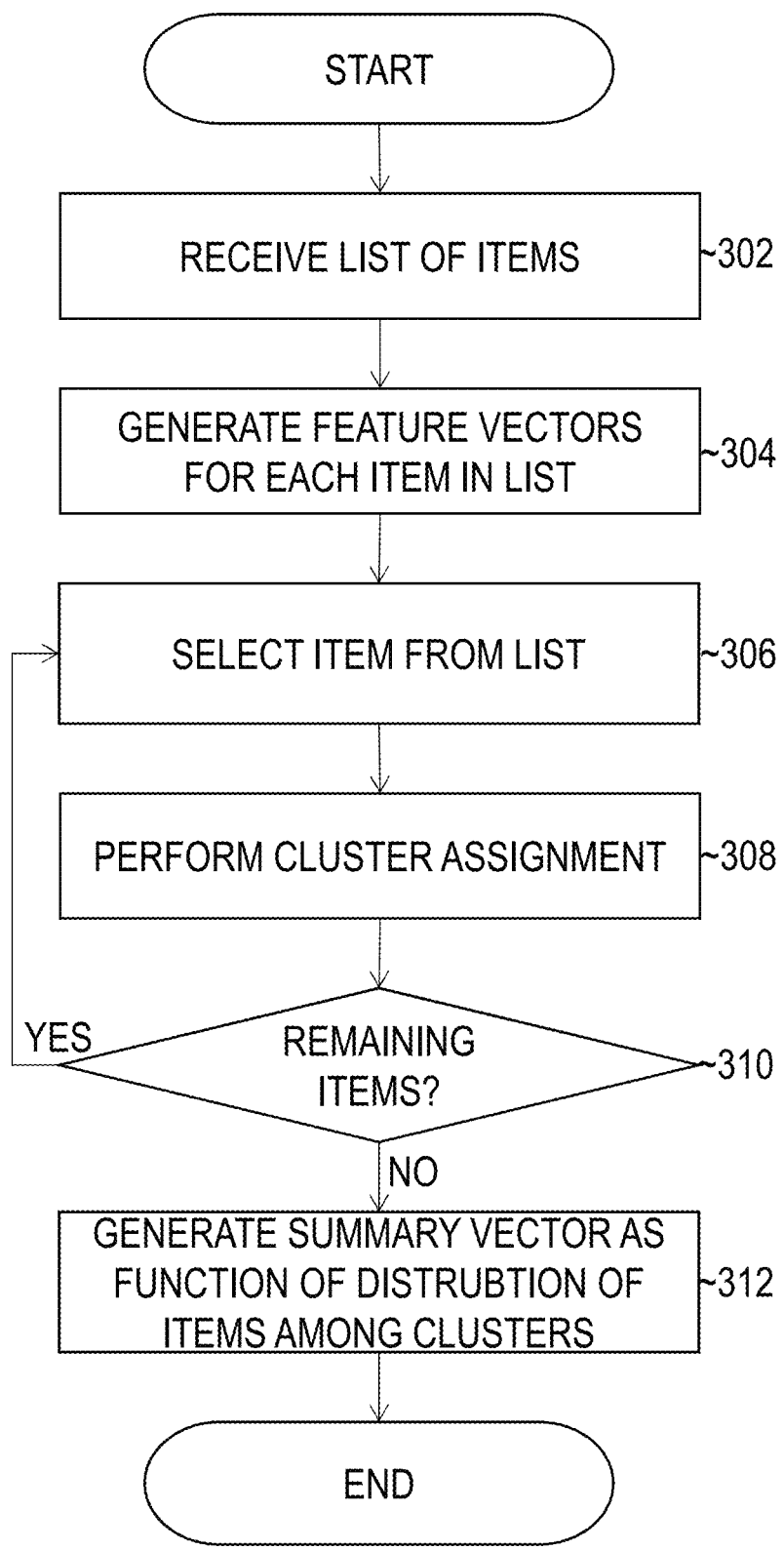
FIG. 3 illustrates an example set of operations for summarizing lists based on item distribution within a set of clusters in accordance with some embodiments.

FIG. 3 illustrates an example set of operations for summarizing lists based on item distribution within a set of clusters in accordance with some embodiments. One or more operations illustrated in FIG. 3 may be modified, rearranged, or omitted. Accordingly, the particular sequence of operations illustrated in FIG. 3 should not be construed as limiting the scope of one or more embodiments.

The summarization process includes receiving a list of items to summarize (operation 302). As previously mentioned, the items in a list may vary from implementation to implementation. Examples include, but are not limited to, a list of recipients for an online campaign, a list of candidate social media posts for a social media campaign, a list of users of a content distribution platform and a list of computing resources in a network environment. However, a list may include any other set of items that may be characterized by a set of attributes and associated with a particular action or task.

The summarization process further includes generating a respective feature vector for each respective item in the list (operation 304). The feature vectors may be generated using the same feature attributes selected in the pre-computation phase. For example, if the universe of known recipients was clustered using varying values for age and income level, then the summarization process may generate, for each respective item, a feature vector that includes two components: one that reflects an age value and a second that reflects an income level value for the respective recipient. However, as previously indicated, the number and types of features may vary depending on the particular implementation. The conclusion of this operation is m n-dimensional feature vectors or an m×n multidimensional feature vector where m is the number of items in the list and n is the number of features used to characterize each item.

The summarization process next selects an item from the list (operation 306). The process may select and iterate through the items in any arbitrary or predetermined order.

The summarization process further includes performing a cluster assignment for the selected item from the list (operation 308). For hard clustering, the summarization process may assign the item to the closest cluster centroid, which may be computed as the centroid having the smallest Euclidean distance from the feature vector generated for the respective item.

For soft-cluster assignments, the summarization process may generate a k-long cluster-membership vector whose components identify a plurality of probabilities that the respective item belongs to different respective clusters in the set of clusters and add up to 1.0. The probabilities may be computed based on Euclidean distances to the centroids of each cluster. For example, a feature vector that matches a cluster centroid may be assigned a 100% probability for that cluster and a 0% probability for the other clusters. The probability may decrease as the cluster centroid gets further from the centroid and increase for the other clusters. Thus, the highest probability is assigned for the cluster with the closest centroid.

The summarization process next determines whether there are any remaining items in the list (operation 310). If so, the process returns to operation 306 and iterates through each item on the list to assign the remaining items. In some embodiments, iterating through the operations results in m k-long cluster-membership vectors. In the hard clustering case, a cluster-membership vector for an item may include a 1 for the cluster to which an item was assigned and a 0 for all other clusters to reflect that the item was assigned to only one cluster. For the soft clustering case, a cluster-membership vector may include a set of k probabilities between 0 and 1, where the sum of the probabilities equals 1.

The summarization process further includes generating a summary vector for the list of items as a function of the distribution of items among the clusters (operation 312). In the hard clustering case, the summary vector may be computed as $$S\_V = [s_1\_V, s_2\_V, \ldots, s_k\_V] = \frac{[count_1\_V, count_2\_V, \ldots, count_k\_V]}{m},$$

where m is the total number of items in the list V having m items $\{v_1, v_2 \ldots v_m\}$ with each item characterized by a corresponding n-dimensional feature vector, $s_j\_v$ is the summary value for component j in the k-long summary vector, and $c_j\_v$ is the number of items in V that belong to cluster j for j=1, 2, ... k. Table 1 below depicts an example of computing a summary vector using hard clustering assignment where k=3 and m=5.

TABLE 1

EXAMPLE COMPUTATION OF A SUMMARY VECTOR AS A FUNCTION OF DISTRIBUTION USING HARD CLUSTERING ASSIGNMENT

|  | $c_1$ | $c_2$ | $c_3$ |
|---|---|---|---|
| $v_1$ | 0 | 1 | 0 |
| $v_2$ | 1 | 0 | 0 |
| $v_3$ | 0 | 1 | 0 |
| $v_4$ | 0 | 0 | 1 |
| $v_5$ | 1 | 0 | 0 |
| count (sum of column values) | $count_1 = 2$ | $count_2 = 2$ | $count_3 = 1$ |
| summary vector (average column value) | $s_1 = 0.4$ | $s_2 = 0.4$ | $s_3 = 0.2$ |

As can be seen in the example above, the cluster-membership vector for each of list items $v_1, v_2, v_3, v_4, v_5$ implies assignment to one and only one cluster. The count value in each column is equal to the number of items assigned to the corresponding column. Each respective element of the summary vector corresponds to a different respective column and is obtained by taking the average (i.e., dividing by m=5). Thus, each respective component of the summary vector is computed as a function of how many items in the list have been assigned to the respective cluster.

In the soft clustering case, the components of the summary vector may be computed as a function of the probabilities reflected in the m k-long cluster membership vectors of the items in V. For example, the summary vector below computes the average probability that items are assigned to each cluster:

$$S_V = [s_{1_V}, s_{2_V}, \ldots, s_{k_V}] = \frac{\sum_{i=1}^{m} P\_v_i}{m} = \frac{\left[\sum_{i=1}^{m} p_1\_v_i, \sum_{i=1}^{m} p_2\_v_i, \ldots, \sum_{i=1}^{m} p_k\_v_i\right]}{m},$$

where $P\_v_i$ includes the set of probabilities $[p_1\_v_i, p_2\_v_i, \ldots, p_k\_v_i]$ that the $i^{th}$ item in list V belongs to cluster j for j=1, 2, ... k. Table 2 below depicts an example of computing a summary vector using soft clustering assignment where k=3 and m=5.

TABLE 2

EXAMPLE COMPUTATION OF A SUMMARY VECTOR
AS A FUNCTION OF DISTRIBUTION USING
SOFT CLUSTERING ASSIGNMENT

|  | $c_1$ | $c_2$ | $c_3$ |
|---|---|---|---|
| $P\_v_1$ | 0.1 | 0.8 | 0.1 |
| $P\_v_2$ | 0.6 | 0.3 | 0.1 |
| $P\_v_3$ | 0.4 | 0.2 | 0.4 |
| $P\_v_4$ | 0.1 | 0.7 | 0.2 |
| $P\_v_5$ | 0.1 | 0 | 0.9 |
| count (sum of column values) | $count_1 = 1.3$ | $count_2 = 2.0$ | $count_3 = 1.7$ |
| summary vector (average column value) | $s_1 = 0.26$ | $s_2 = 0.4$ | $s_3 = 0.34$ |

As can be seen in the example above, the cluster-membership vector for each of list items $v_1$, $v_2$, $v_3$, $v_4$, $v_5$ identifies the probabilities that each item belongs to each respective cluster $c_1$, $c_2$, $c_3$. The count value in each column is equal to the sum of the probabilities for the corresponding cluster. Each respective element of the summary vector corresponds to a different respective column and is obtained by taking the average (i.e., dividing by m=5). Thus, each respective component of the summary vector is computed as a function of the probabilities that items in the list have been assigned to the respective cluster.

3.3 Hard and Soft Clustering Selection

As previously mentioned, hard clustering and soft clustering may be used in both the pre-computation phase to cluster a set of items and the summarization phase to make assignments to the pre-computed clusters. In some embodiments, hard and soft clustering are kept consistent in both phases. That is, if hard clustering is used in the precomputation phase, then the summarization process may also use hard clustering to make assignments and determine list distributions. On the other hand, if soft clustering is used in the precomputation phase, then the summarization process may also use soft clustering assignments.

In other embodiments, the summarization process may diverge from the clustering process used in the precomputation phase. For example, the pre-computation phase may use soft clustering and the summarization process may perform hard clustering assignments. Thus, the items in a list may be assigned to one and only one cluster even when the universe of known items or a representative sample thereof was grouped using soft clustering.

One approach to performing hard clustering assignments is to convert the cluster membership vector for each respective item in a list to an exactly-one-cluster-assignment. The conversion may take place by assigning each respective item in a list to the cluster with the maximum probability value among the set of clusters. Stated another way, the cluster to which an item has the highest probability of belonging may be assigned a "1" and the remaining clusters may be assigned a "0". If the probabilities match for two or more clusters, then one may be arbitrarily selected. For example, the cluster-membership vectors in Table 2 may be converted as depicted in Table 3 below.

TABLE 3

EXAMPLE COMPUTATION OF A SUMMARY VECTOR AFTER
CONVERTING A CLUSTER-MEMBERSHIP VECTOR

|  | $c_1$ | $c_2$ | $c_3$ |
|---|---|---|---|
| $v_1$ | 0 | 1 | 0 |
| $v_2$ | 1 | 0 | 0 |
| $v_3$ | 0 | 0 | 1 |
| $v_4$ | 0 | 1 | 0 |
| $v_5$ | 0 | 0 | 1 |
| count (sum of column values) | $count_1 = 1$ | $count_2 = 2$ | $count_3 = 2$ |
| summary vector (average column value) | $s_1 = 0.2$ | $s_2 = 0.4$ | $s_3 = 0.4$ |

As can be seen, the corresponding probabilities in the soft assignment reflected in the cluster-membership vectors for items $v_1$, $v_2$, $v_3$, $v_4$, $v_5$ have been converted to an exactly-one-cluster-assignment. The components of the summary vector are also changed based on the conversion and updated counts.

3.4 Summary-Based Visualizations and Actions

In some embodiments, summary vectors may be used to render and present visualizations via frontend interface 120. The visualizations may include GUI objects and/or other elements generated as a function of how items in a list are distributed among the set of clusters. For example, the visualization may be a webpage or similar interface that identifies what percentage of a given list is assigned to each distinct cluster. The visualizations may be useful for users to gain a quick understanding of the distribution characteristics of a list without having to sift through all the list items, which may be significant.

Figure 4:
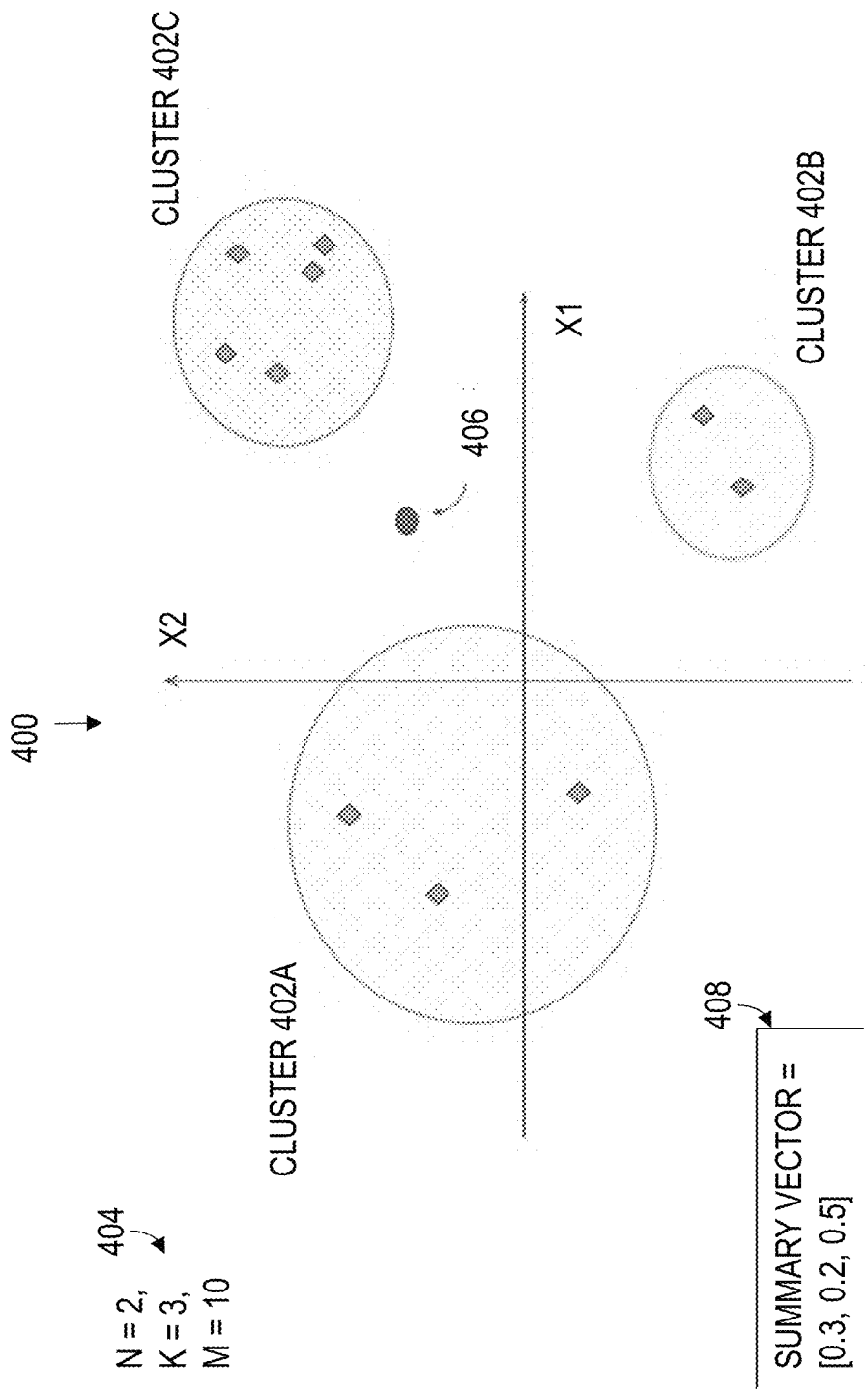
FIG. 4 illustrates an example cluster visualization and corresponding summarization in accordance with some embodiments.

FIG. 4 illustrates example display interface 400 for presenting a set of cluster assignments and a corresponding summarization for a list of items in accordance with some embodiments. Display interface 400 presents three separate clusters: cluster 402a, cluster 402b, and cluster 402c. Display interface 400 further presents clustering parameters 404. In the present example, the number of features used to generate the clusters is n=2. Specifically, the feature space includes features X1 and X2 as shown on the x and y-axis, respectively. The number of clusters in the present example is k=3, and the number of items on the list being summarized is m=10. As can be seen cluster 402a includes three items, cluster 402b includes two items, and cluster 402c includes five items. Visualization 400 presents summary vector 408, which identifies the distribution of items among clusters 402a-c, where the first component has a value of 0.3 and corresponds to cluster 402a, the second component has a value of 0.2 and corresponds to cluster 402b, and the third component has a value of 0.5 and corresponds to cluster 402c.

Display interface 400 further presents centroid 406, which is the average across all items in the list. In the present example, centroid 406 provides limited meaning as three non-homogenous groups of data points exist in the list. Display interface 400 may instead present centroids for each of clusters 402a-c and/or associated labels to facilitate understanding. For example, if X1 represents income and X2 represents age for a given list of recipients, then cluster 402a may correspond to lower-income, middle-aged recipients, cluster 402b may correspond to upper middle income, younger recipients, and cluster 402c may correspond to higher income, older recipients. Summary vector 408 indicates that half the recipients fall within the latter category with the remaining half divided among clusters 402a and 402b.

In some embodiments, display interface 400 may present objects that allow users to act upon one or more items in a list. The actions may include, but are not limited to, removing items from the list, adding items to the list, and executing operations on list-items. In the context of a campaign analytics application, for instance, a user may decide that a list of recipients in cluster 402a are not the ideal target for an online campaign. The user may request, through display interface 400, to prune all or a subset of the items from the list that belong to the cluster. In response, the items may be removed from the list. Thus, the user may quickly filter and adjust the distribution of list items on a per-cluster basis without having to sift through each and every list item, thereby allowing for a more scalable approach. The user may then send the online campaign messages to the updated list of recipients.

As another example, the clusters may group software deployments by configuration parameters. The interface may allow the user to adjust the list of items to which a patch set update is applied and initiate the operations to patch the updated list of software deployments. The interface may invoke one or more APIs via action interface 122 to trigger the actions as previously described.

4.0 Machine-Learning Optimizations and Applications

4.1 Model Training Based on List Summarizations

In some embodiments, ML application 104 is configured to recommend and/or automatically trigger actions. ML application 104 may execute one or more processes that include a training phase for fitting an ML model to the data, an evaluation phase for estimating new labels, and a tuning phase for optimizing an ML model.

Figure 5:
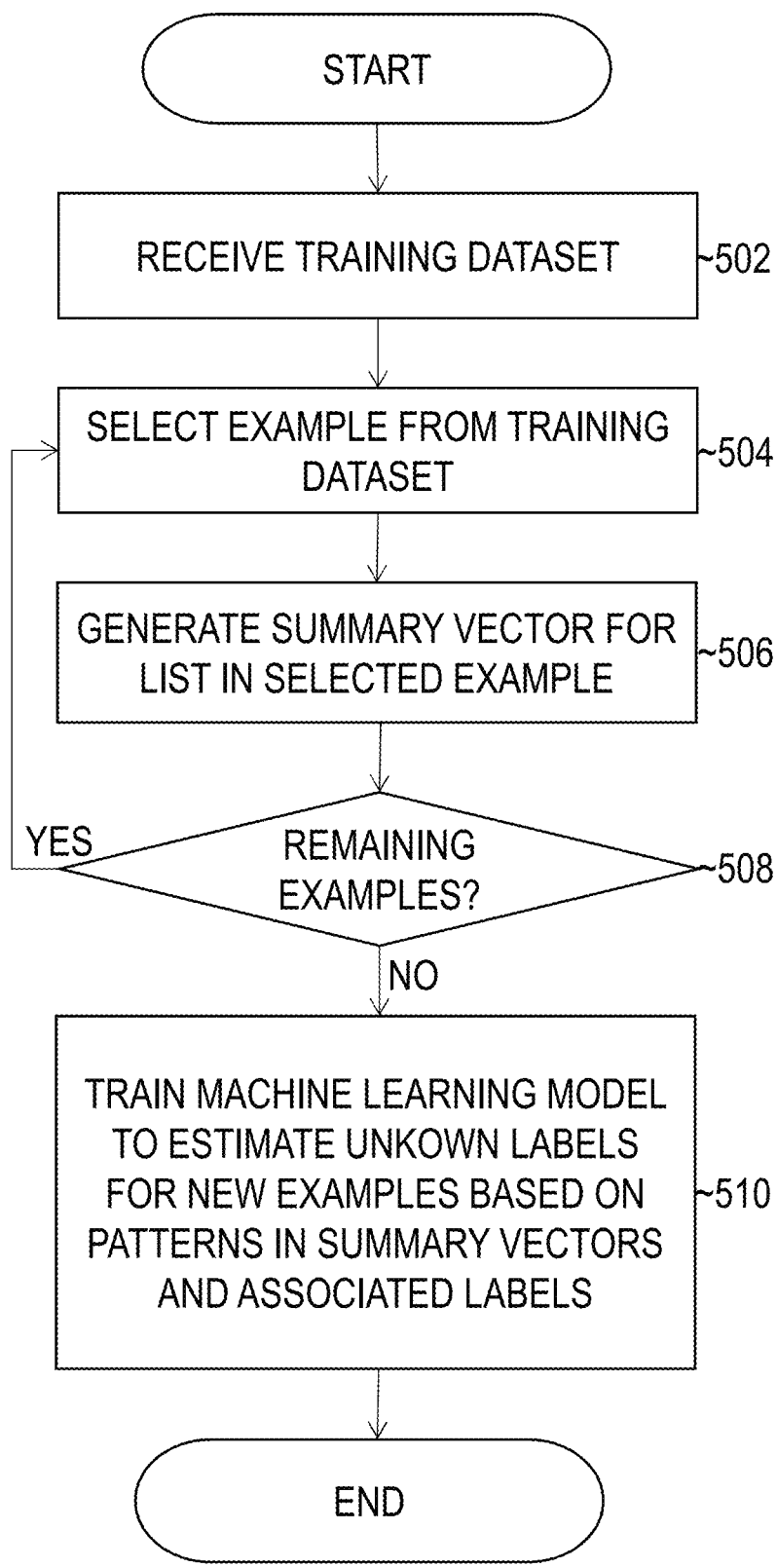
FIG. 5 illustrates an example set of operations for training a machine-learning model in accordance with some embodiments.

FIG. 5 illustrates an example set of operations for training a ML model in accordance with some embodiments. One or more operations illustrated in FIG. 5 may be modified, rearranged, or omitted. Accordingly, the particular sequence of operations illustrated in FIG. 5 should not be construed as limiting the scope of one or more embodiments.

The training process includes receiving a training dataset (operation 502). A training dataset may include a plurality of examples, where each example is associated with a list of items and a label. A label in this context refers to an outcome for the respective example and may be represented by a classification, metric, or other value. For instance, a label may identify the click-through rate for a list of recipients of an email campaign message. Labels for other examples in the training dataset may identify the click-through rate for other lists of recipients. Labels may further identify success rates, failure rates, classifications, and/or other outcomes of various actions taken on or with respect to a list of items.

The training process next selects an example from the training dataset (operation 504). The process may select and iterate through the examples in any arbitrary or predetermined order.

The training process includes generating a respective summary vector for the respective list in the selected example (operation 506). The summary vector may be generated as previously described. The result of this operation is a k-long summary vector that is computed as a function of how items in the respective list of the respective example are distributed in the set of pre-computed clusters.

The training process further includes determining whether there are remaining examples to summarize in the training dataset (operation 508). If so, then the process returns to operation 504 and iterates through the remaining examples to a generate a respective summary vector for the respective list of each remaining example.

The training process next trains a ML model to estimate unknown labels for new examples based on patterns in summary vectors and the associated labels for the training dataset (operation 510). For example, the ML model may be trained to estimate a click-through rate, success rate, failure rate, or any other relevant metric based, at least in part, on the distribution pattern of a list among the set of clusters.

In some embodiments, training the ML model includes forming a feature vector for each example in the training dataset. The summary vector for an example may be used as the training vector or may form any portion of the feature vector. For example, a summary vector for a list of recipients of a campaign message may be appended to other features including, but not limited to, the subject line of the campaign message and the platform through which the campaign message is sent. The feature vectors and associated labels may then be used to train one or more ML models. Example models may include, but are not limited to, logistic regression based models, random forest walkthroughs, artificial neural networks, and support vector machines. The model training may decide what weights, if any, to give to features and/or combinations of features based on patterns learned through the training feature vectors and associated labels.

4.2 Model Predictions Using Summary Vectors

Once trained, a ML model may be used to estimate unknown labels for new examples. Stated another way, the outcome of a given action may be predicted based on the feature values for a new example, even though the specific combination of feature values and corresponding outcome has not been previously observed. For example, a client may request a prediction of the conversion-rate of a new campaign for different audiences. In this case, the new campaign may have a new subject line and/or other features not previously observed. Additionally or alternatively, the list of recipients for one or more of the audiences being analyzed may also be new. ML engine 112 may use the trained ML model to predict the conversion rate based on the patterns learned from the training dataset.

Figure 6:
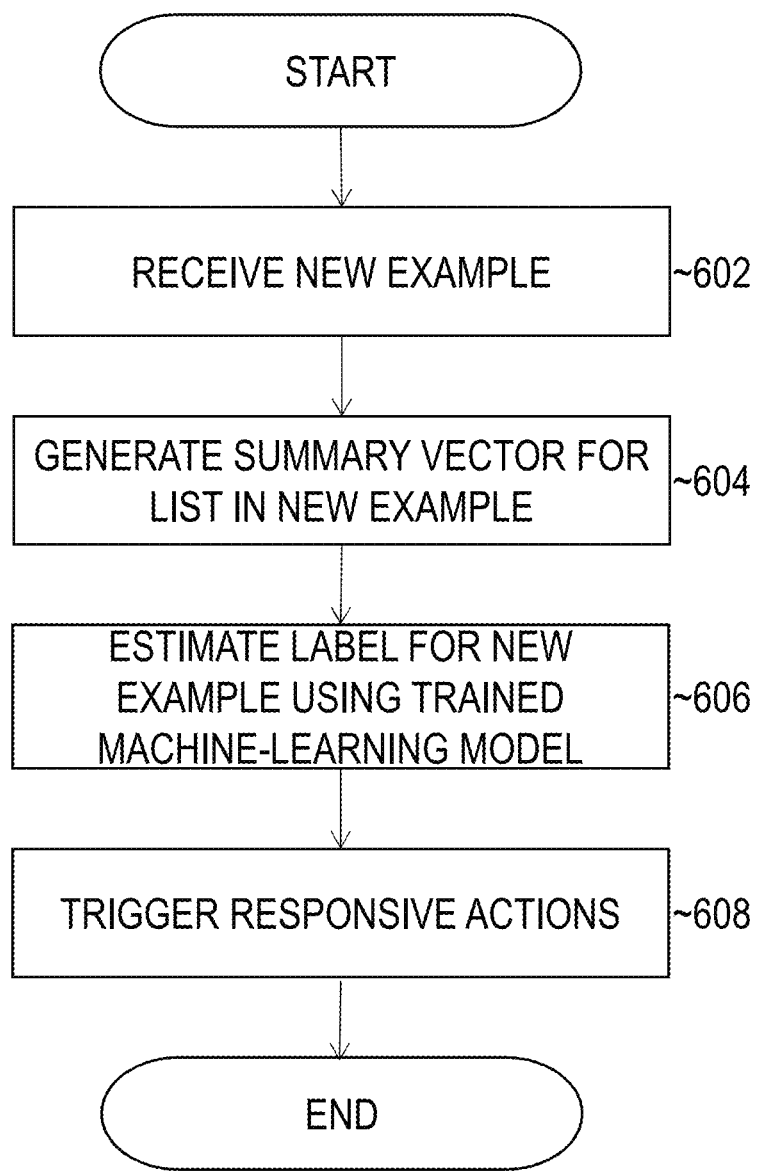
FIG. 6 illustrates an example set of operations for estimating unknown labels for new examples using a trained machine-learning model in accordance with some embodiments.

FIG. 6 illustrates an example set of operations for estimating unknown labels for new examples using a trained ML model in accordance with some embodiments. One or more operations illustrated in FIG. 6 may be modified, rearranged, or omitted. Accordingly, the particular sequence of operations illustrated in FIG. 6 should not be construed as limiting the scope of one or more embodiments.

The estimation process includes receiving a new example for which a label is unknown (operation 602). For example, the new example may be for a new campaign message or an existing campaign message directed to a new list of recipients, as previously mentioned. In other implementations, a new list of items and/or new set of actions to perform on or with respect to the list of items may be received.

The estimation process next generates a summary vector for the list in the new example (operation 604). The summary vector may be generated according to the techniques described above. For instance, the summary vector for the new example may be generated as a function of a distribution of the new set of items within the set of clusters, where the summary vector for the new example has a length equal to how many clusters are in the set of clusters.

The estimation process further includes estimating a label for the new example using the trained ML model (operation 606). In some embodiments, ML engine 112 receives, as input, a feature vector for the new example at this operation and applies the trained model to generate the predicted label.

In some embodiments, the process includes triggering one or more responsive actions (operation 608). The responsive actions that are triggered may vary depending on the particular implementation. As an example, ML engine 112 may trigger, via action interface 122, transmission of an online campaign message, such as sending emails or posting social media messages to a list of recipients if the estimated click-through rate is above a threshold. On the other hand, ML engine 112 may prevent the campaign message from being sent if the predicted click-through rate is below the threshold pending further review by an administrator. As another example, ML engine 112 may analyze several new examples and select the list of recipients predicted to have the highest click-through rate. In yet another example, ML engine 112 may identify a list of users of a network service that are most likely to select a recommended movie or list of movies. Other actions may include, but are not limited to, selecting and rendering GUI objects in a webpage, presenting recommendations, patching software resources, and otherwise reconfiguring computing resources.

4.3 Model Tuning

Figure 7:
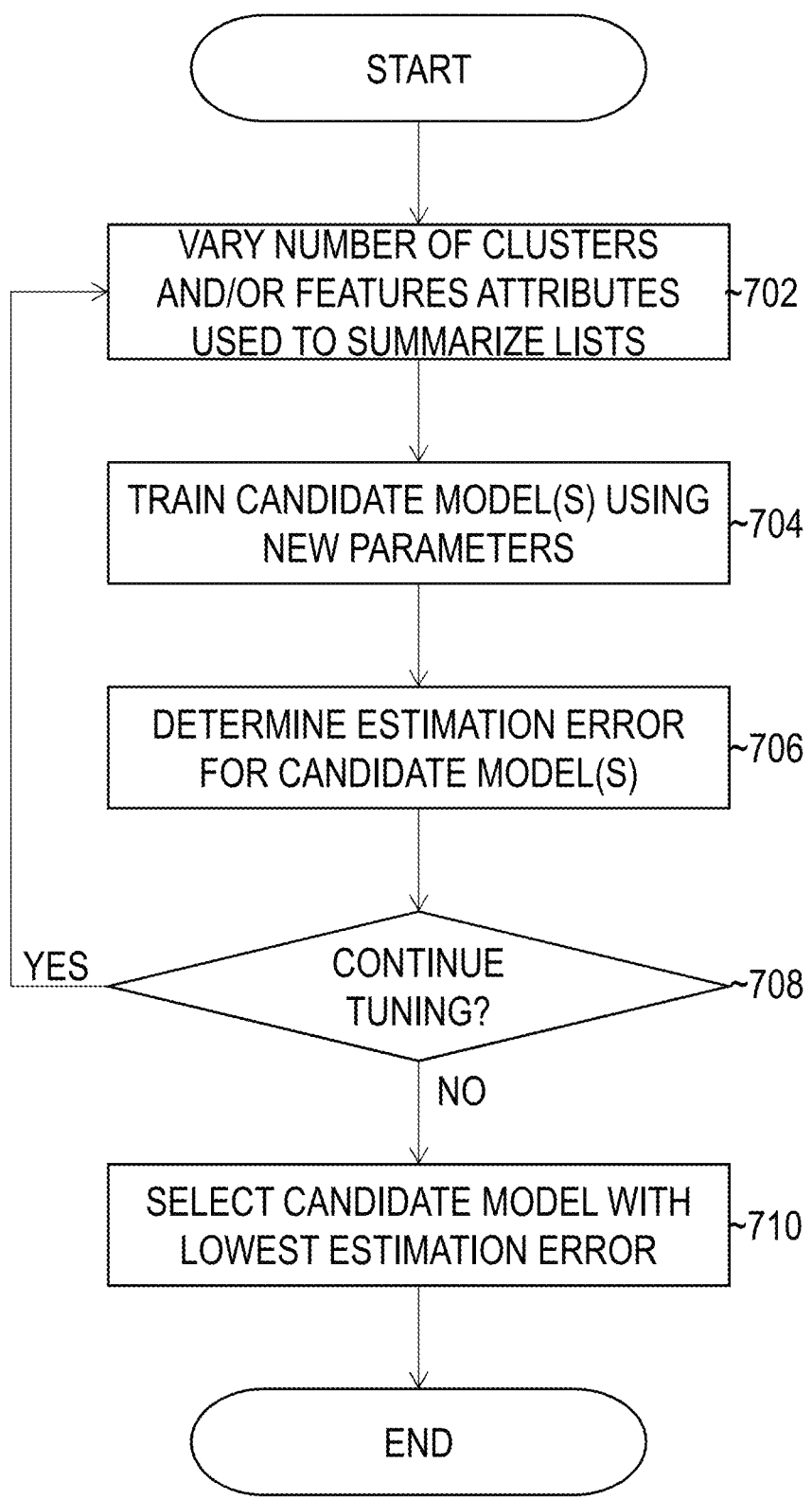
FIG. 7 illustrates an example process for tuning a machine-learning model as a function of estimation error in accordance with some embodiments.

In some embodiments, ML engine 112 may tune the parameters used to summarize lists to optimize model performance. FIG. 7 illustrates an example process for tuning a ML model as a function of estimation error in accordance with some embodiments. One or more operations illustrated in FIG. 7 may be modified, rearranged, or omitted. Accordingly, the particular sequence of operations illustrated in FIG. 7 should not be construed as limiting the scope of one or more embodiments.

The tuning process includes varying the number of clusters and/or feature attributes used to summarize lists (operation 702). In some embodiments, a predefined range of values for k may be used to tune the models. For example, a minimum threshold number of 3 and a maximum threshold of 10 may be used, incrementing by intervals of 1. However, the thresholds and interval may vary from implementation to implementation.

In addition or as an alternative to varying the value for k, the feature attributes used for clustering and assignment may be varied. In some embodiments, varying the feature attributes includes adjusting the number of features in the feature vectors used for clustering and assignment. A minimum and a maximum threshold number may be set, similar to varying the value for k. Additionally or alternatively, for a given number of features, different combinations of features attributes may be used. For example, given a feature vector of size 2 and the feature attributes age, income, state of residence, the following feature vectors may be formed: [age, income], [age, state of residence], and [income, state of residence]. If the size is incremented to 3, then the feature vector may include [age, income, state of residence]. The features may be selected arbitrarily, according to predefined heuristics, or may be curated by a domain expert.

The tuning process next trains one or more candidate models using the new set of parameters (operation 704). During this operation, the process may generate a new set of summary vectors for the training dataset. In particular, the precomputed set of clusters may be updated to reflect the new value of k and/or to group the items using newly formed feature vectors. The new set of summary vectors may then be used to train the candidate models, as previously described. In some embodiments, the same set of feature vectors may be used to train different types of models, such as regression-based models and artificial neural networks, to provide further tuning.

The tuning process further includes determining the estimation error for the candidate models (operation 706). To determine the estimation error, the process may generate estimates for a testing dataset. A testing dataset may include examples that were not used to train the candidate models but for which labels are known. The tuning process may generate a prediction for a respective example in the testing dataset using each candidate model that was trained based on the new parameters and compare it to the respective known labels. The estimation error for an example in a testing dataset may be computed as a function of the difference between the estimated label and the known label. The estimation error for the candidate model may be computed as the average of the estimation error across all examples in the testing dataset.

The tuning process next determines whether to continue tuning (operation 708). For example, the tuning process may iterate through each of the possible values of k and/or possible combinations of features. Additionally or alternatively an estimation error threshold may be set where tuning may stop if the estimation error for one or more of the candidate models is below a threshold.

The tuning process next selects the candidate model with the lowest estimation error (operation 710). The selected model may then be used to evaluate new examples according to the new summarization parameters. For example, if a value of k=5 was determined to yield the lowest estimation error, then the corresponding set of pre-computed clusters may be used during the assignment and summary vector generation steps previously described. In this manner a more accurate ML model may be generated.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In some embodiments, a plugged-in microservice application may expose actions to the micro services manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the micro services manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
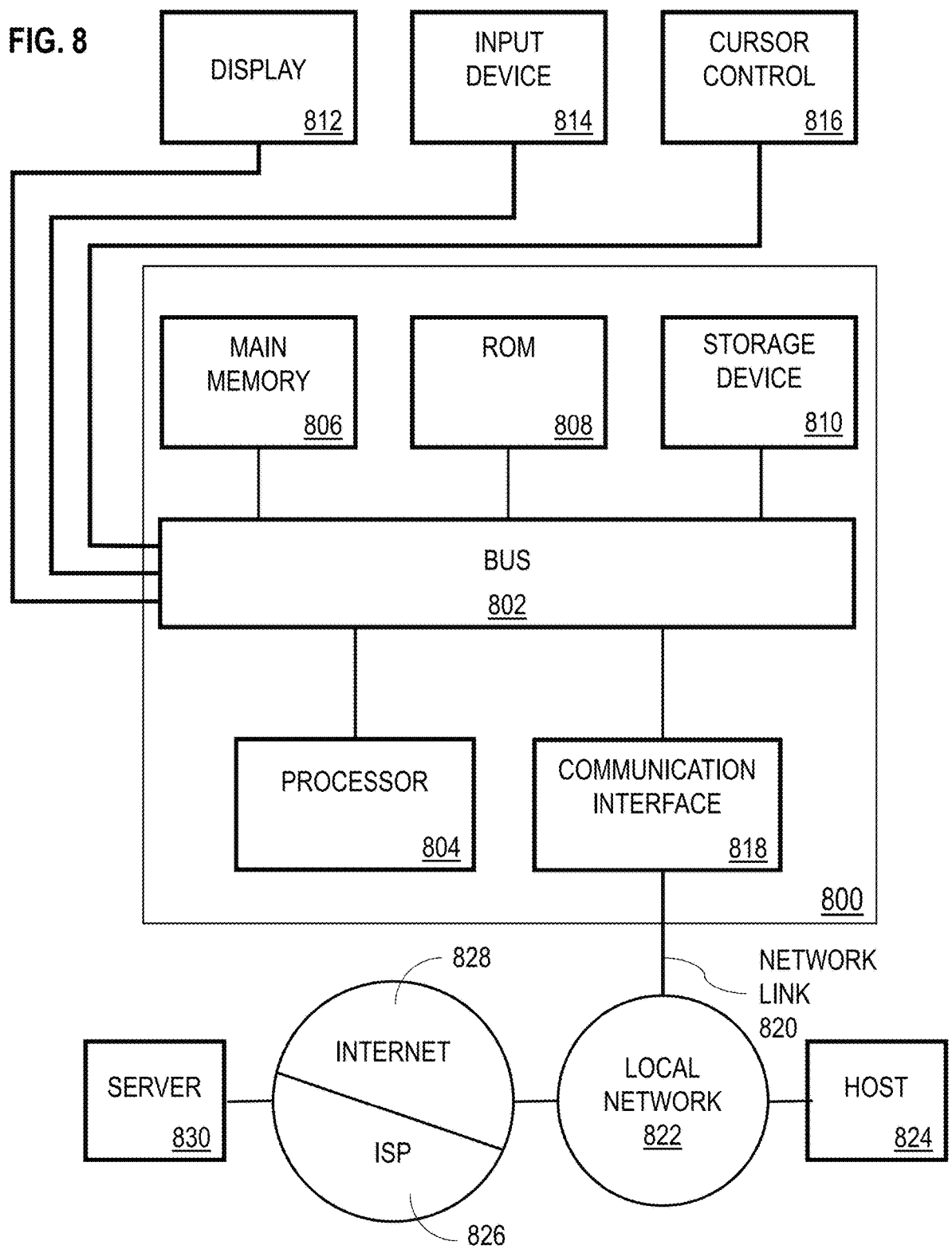
FIG. 8 shows a block diagram that illustrates a computer system in accordance with one or more embodiments.

For example, FIG. 8 is a block diagram that illustrates computer system 800 upon which some embodiments may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8.0 Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    generating a set of clusters, including at least a first cluster and a second cluster, that group different items as a function of varying feature attribute values;
    generating, by a training process using the set of clusters, a compact training dataset for training a neural network to estimate unknown labels for lists, wherein generating the compact training dataset includes:
        accessing, by the training process, a plurality of examples for training the neural network, wherein each respective example of the plurality of examples is associated with a respective list of items represented by a multidimensional feature vector and a respective label classifying the respective list of items;
        for each respective example of the plurality of examples, creating, by the training process within memory, a respective summary vector for the respective list of items associated with the respective example, wherein generating the respective summary vector for the respective list of items includes performing a cluster assignment for each individual item in the respective list of items, wherein the respective summary vector has a length equal to how many clusters are in the set of clusters and is more compact in size within memory than the multidimensional feature vector, wherein the respective summary vector includes a set of components representing different clusters in the set of clusters, wherein a first component in the summary vector identifies what percentage of items in the respective list of items were assigned to the first cluster and a second component in the summary vector identifies what percentage of items in the respective list of items were assigned to the second cluster;
    after generating the compact training dataset, training, using the respective summary vector generated for each respective example in the compact training dataset and the respective label, the neural network to estimate an unknown label for a new list based on inferences drawn from distribution patterns of various lists in the compact training dataset; and
    tuning the neural network to optimize model performance, wherein tuning the machine learning model to optimize model performance includes (a) generating a plurality of candidate neural networks by varying how many clusters are in the set of clusters, (b) generating a plurality of summary vectors of varying length for each respective example in the compact training dataset responsive to varying how many clusters are in the set of clusters, and (c) selecting how many clusters and what length of the respective summary vector are used to train the neural network based on which number of clusters and what length of the respective summary vector results in a lowest error value among the candidate neural networks in estimating labels.

2. The method of claim 1, wherein performing the cluster assignment comprises assigning each individual item in the respective list of items to only one cluster in the set of clusters, wherein the first cluster groups a first subset of one or more items from the respective list of items and the second cluster groups a second subset of one or more items from the respective list of items.

3. The method of claim 1, wherein performing the cluster assignment comprises generating, for each individual item in the respective list of items, a respective cluster membership vector that identifies a plurality of probabilities that the individual item belongs to different respective clusters in the set of clusters, wherein the plurality of probabilities includes a first probability that the individual item belongs to the first cluster in the set of clusters and a second probability that the individual item belongs to the second cluster in the set of clusters.

4. The method of claim 1, further comprising generating, for each individual item in the respective list of items associated with each respective example in the compact training dataset, a respective cluster membership vector that identifies a plurality of probabilities that the individual item belongs to different respective clusters in the set of clusters, wherein the plurality of probabilities includes a first probability that the individual item belongs to the first cluster in the set of clusters and a second probability that the individual item belongs to the second cluster in the set of clusters; and converting the cluster membership vector for each individual item to exactly-one-cluster-assignment by assigning each individual item in the respective list of items to the cluster with the maximum probability value among the set of clusters.

5. The method of claim 1, wherein generating the respective summary vector for the respective list of items comprises generating, for each individual item in the respective list of items, a respective cluster membership vector that identifies a plurality of probabilities that the individual item belongs to different respective clusters in the set of clusters, wherein the plurality of probabilities includes a first probability that the individual item belongs to the first cluster in the set of clusters and a second probability that the individual item belongs to the second cluster in the set of clusters, wherein each component in the set of components is assigned a respective value computed as a function of probabilities that each individual item in the respective list of items belongs to the respective cluster represented by the component.

6. The method of claim 1, wherein the first set of items is a representative sample of observed items for which a targeted action was executed.

7. The method of claim 1, further comprising estimating, by the trained neural network, an unknown label for a new example based at least in part on a summary vector for the new example, wherein the new example is associated with a new set of items, wherein the summary vector for the new example is generated as a function of a distribution of the new set of items within the set of clusters, and wherein the summary vector for the new example has a length equal to how many clusters are in the set of clusters.

8. The method of claim 1, wherein the new list includes a list of recipients for a campaign.

9. One or more non-transitory computer-readable media storing instructions which, when executed by one or more hardware processors, cause:
  generating a set of clusters, including at least a first cluster and a second cluster, that group different items as a function of varying feature attribute values;
  generating, by a training process using the set of clusters, a compact training dataset for training a neural network to estimate unknown labels for lists, wherein generating the compact training dataset includes:
    accessing, by the training process, a plurality of examples for training the neural network, wherein each respective example of the plurality of examples is associated with a respective list of items represented by a multidimensional feature vector and a respective label classifying the respective list of items;
    for each respective example of the plurality of examples, creating, by the training process within memory, a respective summary vector for the respective list of items associated with the respective example, wherein generating the respective summary vector for the respective list of items includes performing a cluster assignment for each individual item in the respective list of items, wherein the respective summary vector has a length equal to how many clusters are in the set of clusters and is more compact in size within memory than the multidimensional feature vector, wherein the respective summary vector includes a set of components representing different clusters in the set of clusters, wherein a first component in the summary vector identifies what percentage of items in the respective list of items were assigned to the first cluster and a second component in the summary vector identifies what percentage of items in the respective list of items were assigned to the second cluster;
  after generating the compact training dataset, training, using the respective summary vector generated for each respective example in the compact training dataset and the respective label, the neural network to estimate an unknown label for a new list based on inferences drawn from distribution patterns of various lists in the compact training dataset; and
  tuning the neural network to optimize model performance, wherein tuning the machine learning model to optimize model performance includes (a) generating a plurality of candidate neural networks by varying how many clusters are in the set of clusters, (b) generating a plurality of summary vectors of varying length for each respective example in the compact training dataset responsive to varying how many clusters are in the set of clusters, and (c) selecting how many clusters and what length of the respective summary vector are used to train the neural network based on which number of clusters and what length of the respective summary vector results in a lowest error value among the candidate neural networks in estimating labels.

10. The one or more non-transitory computer-readable media of claim 9, wherein performing the cluster assignment comprises assigning each individual item in the respective list of items to only one cluster in the set of clusters, wherein the first cluster groups a first subset of one or more items from the respective list of items and the second cluster groups a second subset of one or more items from the respective list of items.

11. The one or more non-transitory computer-readable media of claim 9, wherein performing the cluster assignment comprises generating, for each individual item in the respective list of items, a respective cluster membership vector that identifies a plurality of probabilities that the individual item belongs to different respective clusters in the set of clusters, wherein the plurality of probabilities includes a first probability that the individual item belongs to the first cluster in the set of clusters and a second probability that the individual item belongs to the second cluster in the set of clusters.

12. The one or more non-transitory computer-readable media of claim 9, further comprising generating, for each individual item in the respective list of items associated with each respective example in the compact training dataset, a respective cluster membership vector that identifies a plurality of probabilities that the individual item belongs to different respective clusters in the set of clusters, wherein the plurality of probabilities includes a first probability that the individual item belongs to the first cluster in the set of clusters and a second probability that the individual item belongs to the second cluster in the set of clusters; and converting the cluster membership vector for each individual item to exactly-one-cluster-assignment by assigning each individual item in the respective list of items to the cluster with the maximum probability value among the set of clusters.

13. The one or more non-transitory computer-readable media of claim 9, wherein generating the respective summary vector for the respective list of items comprises generating, for each individual item in the respective list of items, a respective cluster membership vector that identifies a plurality of probabilities that the individual item belongs to different respective clusters in the set of clusters, wherein the plurality of probabilities includes a first probability that the individual item belongs to the first cluster in the set of clusters and a second probability that the individual item belongs to the second cluster in the set of clusters, wherein each component in the set of components is assigned a respective value computed as a function of probabilities that each individual item in the respective list of items belongs to the respective cluster represented by the component.

14. The one or more non-transitory computer-readable media of claim 9, wherein the first set of items is a representative sample of observed items for which a targeted action was executed.

15. The one or more non-transitory computer-readable media of claim 9, further comprising estimating, by the trained machine learning model, an unknown label for a new example based at least in part on a summary vector for the new example, wherein the new example is associated with a new set of items, wherein the summary vector for the new example is generated as a function of a distribution of the new set of items within the set of clusters, and wherein the summary vector for the new example has a length equal to how many clusters are in the set of clusters.

16. A system comprising:
one or more hardware processors;
one or more non-transitory computer-readable media storing instructions which, when executed by the one or more hardware processors, cause:
generating a set of clusters, including at least a first cluster and a second cluster, that group different items as a function of varying feature attribute values;
generating, by a training process using the set of clusters, a compact training dataset for training a neural network to estimate unknown labels for lists, wherein generating the compact training dataset includes:
accessing, by the training process, a plurality of examples for training the neural network, wherein each respective example of the plurality of examples is associated with a respective list of items represented by a multidimensional feature vector and a respective label classifying the respective list of items;
for each respective example of the plurality of examples, creating, by the training process within memory, a respective summary vector for the respective list of items associated with the respective example, wherein generating the respective summary vector for the respective list of items includes performing a cluster assignment for each individual item in the respective list of items, wherein the respective summary vector has a length equal to how many clusters are in the set of clusters and is more compact in size within memory than the multidimensional feature vector, wherein the respective summary vector includes a set of components representing different clusters in the set of clusters, wherein a first component in the summary vector identifies what percentage of items in the respective list of items were assigned to the first cluster and a second component in the summary vector identifies what percentage of items in the respective list of items were assigned to the second cluster;
after generating the compact training dataset, training, using the respective summary vector generated for each respective example in the compact training dataset and the respective label, the neural network to estimate an unknown label for a new list based on inferences drawn from distribution patterns of various lists in the compact training dataset; and
tuning the neural network to optimize model performance, wherein tuning the machine learning model to optimize model performance includes (a) generating a plurality of candidate neural networks by varying how many clusters are in the set of clusters, (b) generating a plurality of summary vectors of varying length for each respective example in the compact training dataset responsive to varying how many clusters are in the set of clusters, and (c) selecting how many clusters and what length of the respective summary vector are used to train the neural network based on which number of clusters and what length of the respective summary vector results in a lowest error value among the candidate neural networks in estimating labels.

17. The system of claim 16, wherein performing the cluster assignment comprises assigning each individual item in the respective list of items to only one cluster in the set of clusters, wherein the first cluster groups a first subset of one or more items from the respective list of items and the second cluster groups a second subset of one or more items from the respective list of items.

18. The system of claim 16, wherein performing the cluster assignment comprises generating, for each individual item in the respective list of items, a respective cluster membership vector that identifies a plurality of probabilities that the individual item belongs to different respective clusters in the set of clusters, wherein the plurality of probabilities includes a first probability that the individual item belongs to the first cluster in the set of clusters and a second probability that the individual item belongs to the second cluster in the set of clusters.

19. The system of claim 16, further comprising generating, for each individual item in the respective list of items associated with each respective example in the compact training dataset, a respective cluster membership vector that identifies a plurality of probabilities that the individual item belongs to different respective clusters in the set of clusters, wherein the plurality of probabilities includes a first probability that the individual item belongs to the first cluster in the set of clusters and a second probability that the individual item belongs to the second cluster in the set of clusters; and converting the cluster membership vector for each individual item to exactly-one-cluster-assignment by assigning each individual item in the respective list of items to the cluster with the maximum probability value among the set of clusters.

20. The system of claim 16, wherein generating the respective summary vector for the respective list of items comprises generating, for each individual item in the respective list of items, a respective cluster membership vector that identifies a plurality of probabilities that the individual item belongs to different respective clusters in the set of clusters, wherein the plurality of probabilities includes a first probability that the individual item belongs to the first cluster in the set of clusters and a second probability that the individual item belongs to the second cluster in the set of clusters, wherein each component in the set of components is assigned a respective value computed as a function of probabilities that each individual item in the respective list of items belongs to the respective cluster represented by the component.

* * * * *